(12) United States Patent
Lin et al.

(10) Patent No.: US 9,871,554 B2
(45) Date of Patent: Jan. 16, 2018

(54) METHOD AND VECTOR COMPUTING UNIT FOR IMPLEMENTING DE-SCRAMBLING AND DE-SPREADING, AND COMPUTER STORAGE MEDIUM

(71) Applicant: ZHOGNXING Microelectronics Technology Co. Ltd, Shenzhen (CN)

(72) Inventors: Wenqiong Lin, Shenzhen (CN); Li Hua, Shenzhen (CN); Yongsheng Zhang, Shenzhen (CN)

(73) Assignee: ZTE MICROELECTRONICS TECHNOLOGY CO., LTD., Guangdong (CN)

( * ) Notice: Subject to any disclaimer, the term of this patent is extended or adjusted under 35 U.S.C. 154(b) by 7 days.

(21) Appl. No.: 15/109,465

(22) PCT Filed: Jul. 15, 2014

(86) PCT No.: PCT/CN2014/082280
§ 371 (c)(1),
(2) Date: Jul. 1, 2016

(87) PCT Pub. No.: WO2015/101012
PCT Pub. Date: Jul. 9, 2015

(65) Prior Publication Data
US 2016/0336995 A1  Nov. 17, 2016

(30) Foreign Application Priority Data
Jan. 2, 2014  (CN) .......................... 2014 1 0002164

(51) Int. Cl.
*H04B 1/00*  (2006.01)
*H04B 1/707*  (2011.01)
(Continued)

(52) U.S. Cl.
CPC ......... *H04B 1/707* (2013.01); *H04B 1/70751* (2013.01); *H04W 84/042* (2013.01)

(58) Field of Classification Search
CPC .. H04B 1/707; H04B 1/70751; H04W 84/042
(Continued)

(56) References Cited

U.S. PATENT DOCUMENTS 7,801,935 B2  9/2010  Kishore

FOREIGN PATENT DOCUMENTS

| CN | 101064581 A | 10/2007 |
|---|---|---|
| CN | 101193285 A | 6/2008 |
| CN | 101207468 A | 6/2008 |

OTHER PUBLICATIONS

International Search Report for corresponding application PCT/CN2014/082280 filed on Jul. 15, 2014; dated Oct. 13, 2014.

*Primary Examiner* — Daniel Washburn
*Assistant Examiner* — Fitwi Hailegiorgis
(74) *Attorney, Agent, or Firm* — Cantor Colburn LLP

(57) ABSTRACT

Provided are a method and vector computing unit for implementing de-scrambling and de-spreading, and a computer storage medium. The method includes that: an operation of complex multiplication on baseband data and corresponding de-scrambling and de-spreading codes is performed by adopting data transformation and addition, and data obtained by the complex multiplication is stored into a vector register file; a row of data obtained by the complex multiplication is read from the vector register file, every two adjacent pieces of data in the row of data are accumulated to obtain a half row of data, a ¼ row of data, and finally one piece of accumulated data; and the accumulation processing is continued on other rows of data to implement accumulation of each row of data obtained by the complex multiplication in the vector register file.

20 Claims, 6 Drawing Sheets

(51) Int. Cl.
*H04B 1/7075* (2011.01)
*H04W 84/04* (2009.01)
(58) Field of Classification Search
USPC .......................................................... 375/140
See application file for complete search history.

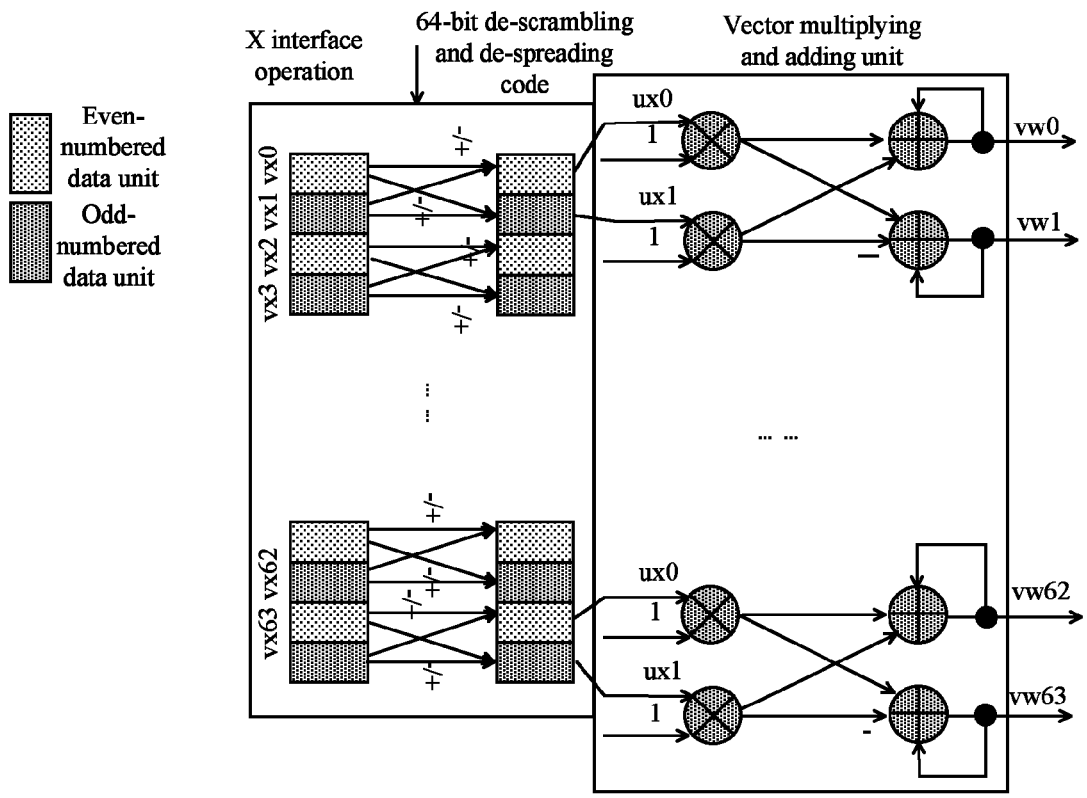

Fig. 4

| 501 | N pieces of stored data obtained by the complex multiplication in each row are read from a vector register file, and are pairwise added to obtain N/2 pieces of data, and the N/2 pieces of data are stored into the vector register file |

| 502 | The N/2 pieces of data are read from the vector register file, and are pairwise added to obtain N/4 pieces of data, and the N/4 pieces of data are stored; and by repeating the processing, pairwise addition processing is performed on the stored data obtained by the complex multiplication in each row in the vector register file for multiple times until the data of each row is accumulated to finally obtain one piece of data for each row |

Fig. 5

METHOD AND VECTOR COMPUTING UNIT FOR IMPLEMENTING DE-SCRAMBLING AND DE-SPREADING, AND COMPUTER STORAGE MEDIUM

TECHNICAL FIELD

The present disclosure relates to a de-scrambling and de-spreading technology in the field of communication, and in particular to a method and vector computing unit for implementing de-scrambling and de-spreading, and a computer storage medium.

BACKGROUND

Along with dramatic development of mobile communication technologies, a communication mode is developed from a Global System for Mobile Communications (GSM) mode to a Wideband Code Division Multiple Access (WCDMA) mode and then further to a Long Term Evolution (LTE) mode. Currently, there emerge more and more communication modes which become more and more complicated. Adoption of a conventional Application Specific Integrated Circuit (ASIC) manner for implementing multiple communication modes has the problems of large chip area and long market orientation period, as well as the problems of high circuit customization degree, inflexibility and high risk.

Soft-baseband-based implementation of multiple communication modes is a trend of development in the future. However, a common soft-baseband-based vector computing unit is low in efficiency and high in power consumption when implementing Code Division Multiple Access (CDMA) de-scrambling and de-spreading related operation.

SUMMARY

In order to solve the existing technical problem, the embodiments of the present disclosure provide a method and vector computing unit for implementing de-scrambling and de-spreading, and a computer storage medium.

The technical solutions of the embodiments of the present disclosure are implemented as follows.

An embodiment of the present disclosure provides a method for implementing de-scrambling and de-spreading, which may include that:

an operation of complex multiplication on baseband data and corresponding de-scrambling and de-spreading codes is performed by adopting data transformation and addition, and data obtained by the complex multiplication is stored into a vector register file;

a row of data obtained by the complex multiplication is read from the vector register file, every two adjacent pieces of data in the row of data are accumulated to obtain a half row of data, and the obtained data is stored back into the vector register file; a previous accumulation result from the vector register file or a previous accumulation result reserved in a result register of a vector computing unit is read, every two adjacent pieces of data in the previous accumulation result are accumulated to obtain a ¼ row of data, and accumulation is continued to finally obtain one piece of accumulated data; and the accumulation processing is continued on other rows of data in the same manner to implement accumulation of each row of data obtained by the complex multiplication in the vector register file.

Another embodiment of the present disclosure provides a vector computing unit for implementing de-scrambling and de-spreading, which may include: a vector register file, a reading interface operation unit and a vector multiplying and adding unit, wherein the vector register file may be configured to store baseband data, results obtained by multiplying the baseband data and corresponding de-scrambling and de-spreading codes, inter-row data accumulation results and intra-row pairwise data accumulation results;

the reading interface operation unit may be configured to read the baseband data from the vector register file and perform data transformation on the baseband data according to the corresponding de-scrambling and de-spreading codes, or, read data obtained by multiplying the baseband data and the de-scrambling and de-spreading codes or accumulated data from the vector register file and perform data position exchange required by addition of every two adjacent pieces of data; and the vector multiplying and adding unit may be configured to perform addition processing on the data transformed by the reading interface operation unit and store an obtained result into the vector register file, and may further be configured to read from the vector register file a row of data obtained by the complex multiplication, accumulate every two adjacent pieces of data to obtain a half row of data, store the obtained data back into the vector register file, continue reading a previous accumulation result from the vector register file or a previous accumulation result reserved in a result register of the vector computing unit, accumulate every two adjacent pieces of data in the previous accumulation result to obtain a ¼ row of data, continue accumulation to finally obtain one piece of accumulated data, and continue the accumulation processing on other rows of data to implement accumulation of each row of data obtained by the complex multiplication in the vector register file.

Still another embodiment of the present disclosure provides a computer storage medium, in which a computer program may be stored, the computer program being configured to execute the abovementioned method for implementing de-scrambling and de-spreading.

According to the method and vector computing unit for implementing de-scrambling and de-spreading, and computer storage medium provided by the embodiments of the present disclosure, an operation of complex multiplication on the baseband data and the corresponding de-scrambling and de-spreading codes is performed by adopting data transformation and addition, and the data obtained by the complex multiplication is stored into the vector register file; a row of data obtained by the complex multiplication is read from the vector register file, every two adjacent pieces of data in the row of data are accumulated to obtain a half row of data, and the obtained data is stored back into the vector register file; the previous accumulation result from the vector register file or the previous accumulation result reserved in the result register of the vector computing unit is read, every two adjacent pieces of data in the previous accumulation result are accumulated to obtain a ¼ row of data, and accumulation is continued to finally obtain one piece of accumulated data; and accumulation processing is continued on other rows of data in the same manner to implement accumulation of each row of data obtained by the complex multiplication in the vector register file.

In the embodiment of the present disclosure, the multiplying processing of the de-scrambling and de-spreading codes and the baseband data is implemented only by simple transformation and addition operation rather than general multiplication operation, and the de-scrambling and de-spreading codes are generated together with the baseband data, and therefore are not required to be read, so that efficiency is improved. In addition, during intra-row pairwise data accumulation, an iteration method which fully utilizes all adders during each accumulation can improve the efficiency, and reduce the power consumption. Moreover, the following improvements can be achieved by the embodiments of the present disclosure on the premise of not increasing the number of the adders:

1) operation of position exchange, symbol transformation and the like is performed on adjacent data units of a vector read by an X reading interface, and 2) adder output is written back to adder input.

In this way, a de-scrambling and de-spreading function may be added with low circuit cost on the basis of a computing unit supporting common real and complex multiplication addition, multiplication accumulation and FFT butterfly operation.

BRIEF DESCRIPTION OF THE DRAWINGS

FIG. 4 is a block diagram showing the principle of a mac 1nj command according to an embodiment of the present disclosure;

FIG. 5 is an implementation flowchart of a method for accumulating each row of data obtained by the complex multiplication in a vector register file in FIG. 2 according to an embodiment of the present disclosure;

DETAILED DESCRIPTION OF THE EMBODIMENTS

Figure 1:
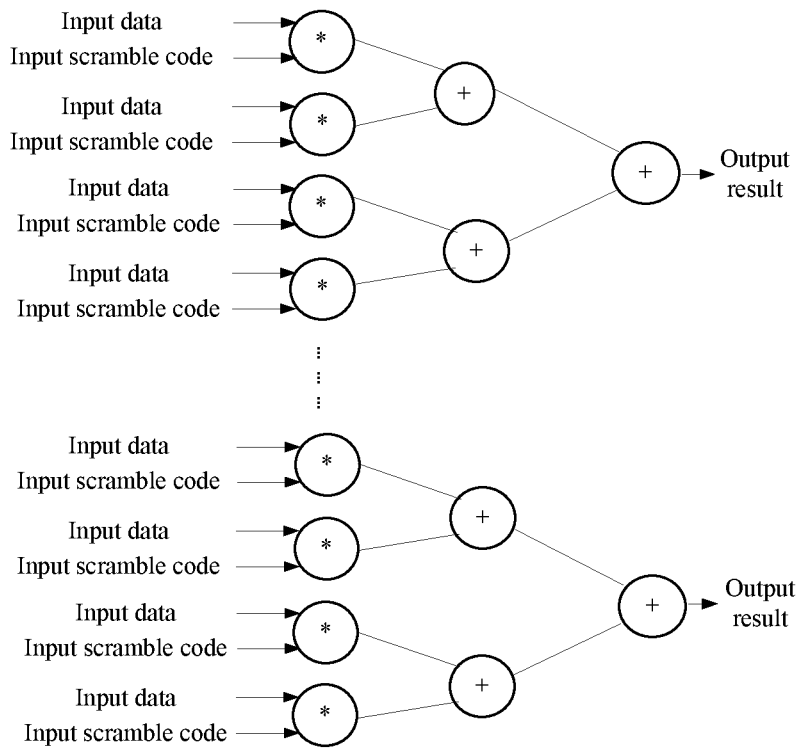
FIG. 1 is a block diagram showing the principle of de-scrambling and de-spreading implemented in a common parallel manner.

FIG. 1 is a block diagram showing the principle of de-scrambling and de-spreading implemented in a common parallel manner. As shown in FIG. 1, de-scrambling and de-spreading codes are multiplied with corresponding baseband data, and then accumulation is performed on the data obtained by the multiplication. In the figure, two-stage of accumulation is shown, which is equivalent to the situation that a spreading factor is 4. 5-stage of accumulation is required if the spreading factor is 32. k-stage of accumulation is required if the spreading factor is $2 \wedge k$. Many adders are required if a parallel accumulation manner is adopted, and the number of adders is n/2 (n is the amount of data included in a vector).

Figure 2:
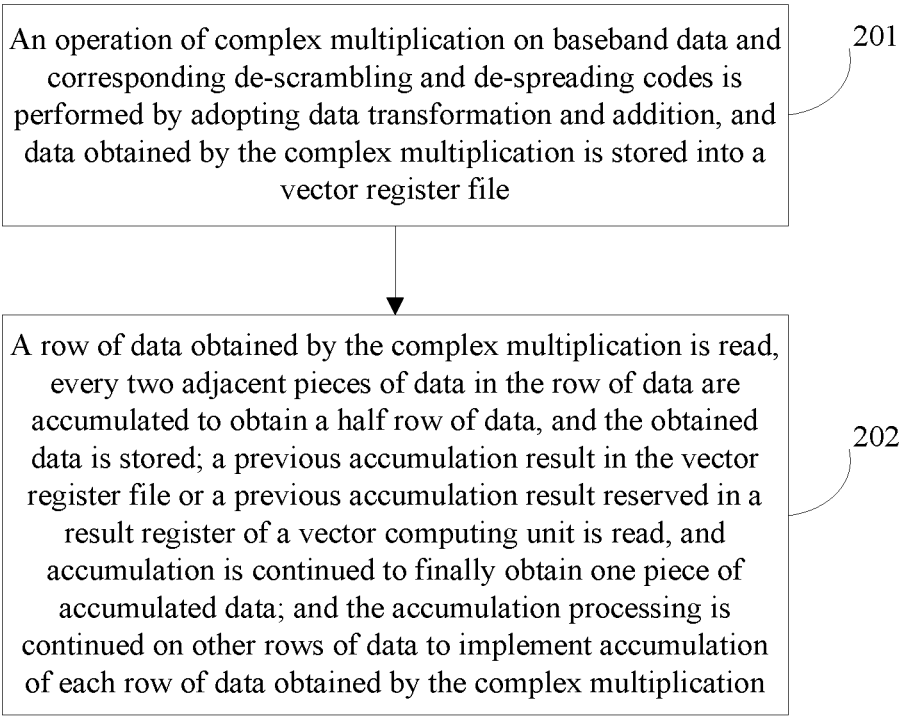
FIG. 2 is an implementation flowchart of a method for de-scrambling and de-spreading according to an embodiment of the present disclosure.

FIG. 2 is an implementation flowchart of a method for de-scrambling and de-spreading according to an embodiment of the present disclosure. As shown in FIG. 2, the method includes:

Step 201: an operation of complex multiplication on baseband data and corresponding de-scrambling and de-spreading codes is performed by adopting data transformation and addition, and data obtained by the complex multiplication is stored into a vector register file;

Step 202: a row of data obtained by the complex multiplication is read from the vector register file, every two adjacent pieces of data in the row of data are accumulated to obtain a half row of data, and the obtained data is stored back into the vector register file; a previous accumulation result in the vector register file or a previous accumulation result reserved in a result register of a vector computing unit is read, every two adjacent pieces of data in the previous accumulation result are accumulated to obtain a ¼ row of data, and accumulation is continued to finally obtain one piece of accumulated data; and the accumulation processing on other rows of data is continued in the same manner to implement accumulation of each row of data obtained by the complex multiplication in the vector register file.

Step 201 may include:

a first row of baseband data read from the vector register file is transformed according to a corresponding de-scrambling and de-spreading code, data obtained by transformation is added, and an obtained result is stored in the vector register file; the same transformation and addition processing is executed on a second row of baseband data read from the vector register file to implement multiplication with a corresponding de-scrambling and de-spreading code; if the results of the two rows of baseband data are required to be accumulated, a result of a current row of baseband data is accumulated with a result of a previous row of baseband data stored in the result register of the vector computing unit after multiplication with the corresponding de-scrambling and de-spreading code is implemented, and an accumulation result is stored back into the vector register file; and the same processing on other rows of baseband data is continued in the same manner to implement multiplication of all the baseband data and the corresponding de-scrambling and de-spreading codes.

In a practical application process, Step 201 is implemented on the basis of the vector computing unit by adopting mult 1nj and mac 1nj commands.

The mult 1nj command is mult vw, vx, 1nj, nw; // representing vx*1nj which is written back into vector register pair vv indicated by pointer vw. Wherein, vx represents baseband data read from the vector register file, 1nj represents a de-scrambling and de-spreading code, and nw represents that a result is not written back into a vector register so as to reduce power consumption.

Figure 3:
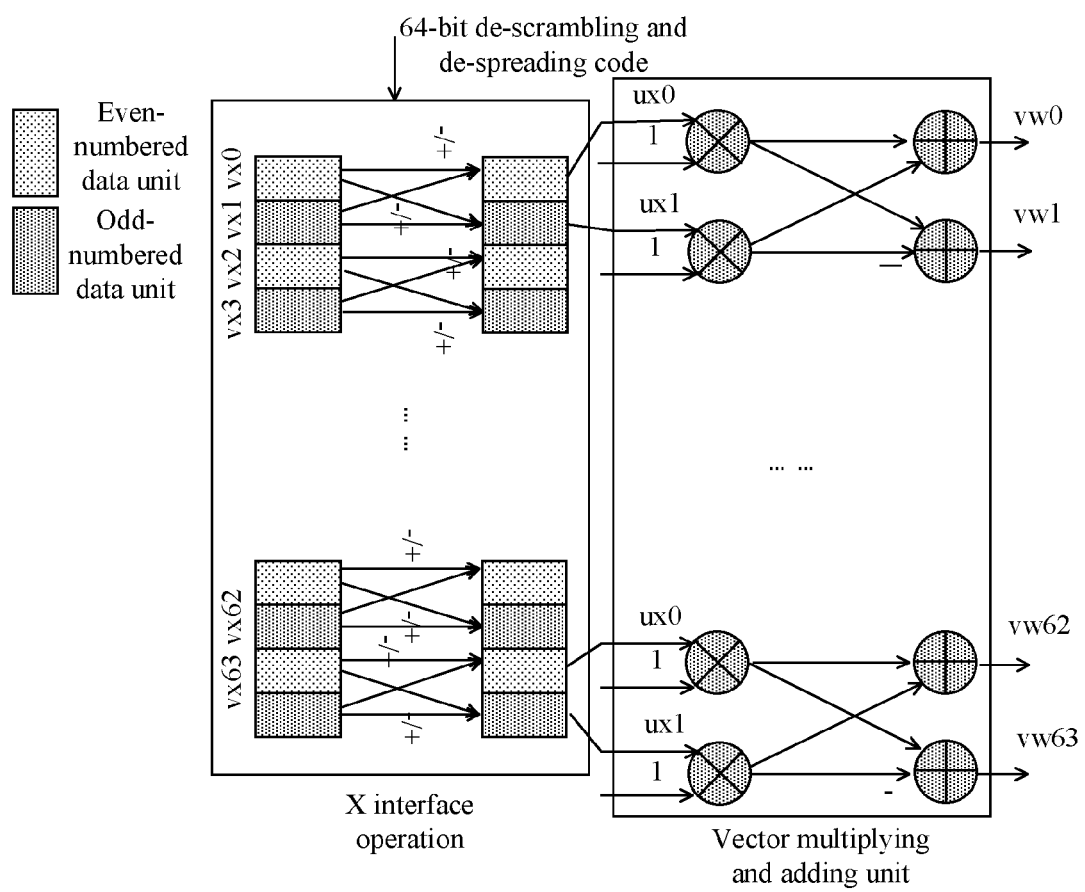
FIG. 3 is a block diagram showing the principle of a mult 1nj command according to an embodiment of the present disclosure.

For example, there are 32 pieces of baseband data, and mult vw, vx, 1nj, nw; is executed to implement multiplication of de-scrambling and de-spreading codes and the baseband data. As shown in FIG. 3, transformation is performed on 32 complexes read via interface vx according to the de-scrambling and de-spreading codes (there are four de-scrambling and de-spreading codes) as follows:

| De-scrambling and de-spreading code | Representation | Input data vx | Output ux |
|---|---|---|---|
| 1 + j | 00 | a + jb | a − jb |
| 1 − j | 01 | a + jb | a + jb |

-continued

| De-scrambling and de-spreading code | Representation | Input data vx | Output ux |
|---|---|---|---|
| −1 + j | 10 | a + jb | −b − ja |
| −1 − j | 11 | a + jb | −a + jb |

Therefore, correspondingly in the vector computing unit, $$vw(i)=ux(i)*1+ux(i+1)*1;$$

$$vw(i+1)=ux(i)*1-ux(i+1)*1;\text{ and}$$

i=0, 2, 4, . . . , 62.

For example, for (a+jb)*(1+j)=a−b+(a+b)j, a+jb is transformed into a−jb at first, and is sent to the vector computing unit to obtain a real part of a*1+(−b)*1=a−b and a virtual part of a*1−(−b)*1=a+b.

The mac 1nj command is mac vw, vx, 1nj, nw; // representing vx*1nj added with a previous product, and the result is written back into the vector register pair vv indicated by pointer vw. Wherein, vx represents baseband data read from the vector register file, 1nj represents a de-scrambling and de-spreading code, and nw represents that a result is not written back into the vector register so as to reduce power consumption. The mac 1nj command is usually executed after the mult 1nj command.

FIG. 4 is a block diagram showing the principle of mac 1nj. The principle of mac 1nj is similar to a principle of mult 1nj, and the difference is that for mac 1nj, the previous mult 1nj product is required to be accumulated.

It is important to note that the mult 1nj and mac 1nj commands have no requirements on the amount of baseband data to be processed.

In the solution, an implementation method of Step 202, as shown in FIG. 5, includes:

Step 501: N pieces of stored data obtained by the complex multiplication in each row are read from the vector register file, and are pairwise added to obtain N/2 pieces of data, and the N/2 pieces of data are stored into the vector register file; and Step 502: the N/2 pieces of data are read from the vector register file, and are pairwise added to obtain N/4 pieces of data, and the N/4 pieces of data are stored; and by repeating the processing, pairwise addition processing is performed on the stored data obtained by the complex multiplication in each row in the vector register file for multiple times until the data of each row is accumulated to finally obtain one piece of data for each row.

In the solution, N is a positive integer. By the flow, an accumulation function reducing the amount of data in a vector to half of the original amount is realized.

It is important to note that not every row of data is required to be accumulated to finally obtain one piece of data, that is, accumulation may be performed for a certain number of times to obtain a certain number of pieces of data results according to a configuration requirement. For example, if each row includes 32 pieces of data and the number of accumulation times is configured to be 8, accumulation is performed for three times to obtain four pieces of data results; and if the number of accumulation times is configured to be 32, accumulation is performed for five times to obtain one piece of data result. The above mentioned content is intra-row accumulation.

In a practical application process, Step 501 and Step 502 may be implemented on the basis of the vector computing unit by adopting an sxu command. The sxu command is sxu op_num, vw, vx, nw; // representing implementation of a process of accumulating 32 complexes into 16 complexes, and nw represents that a result is not written back into the vector register so as to reduce power consumption.

In the above process, op_num=16/8/4/2/1 representing the number of accumulation results, and is used in combination with write-mask to implement data writeback as required. If op_num=8 and mask=0x0000_00ff, it is indicated that the left 8 complexes may be written back. The clock for complex adders not executed can be closed to reduce power consumption.

Figure 6:
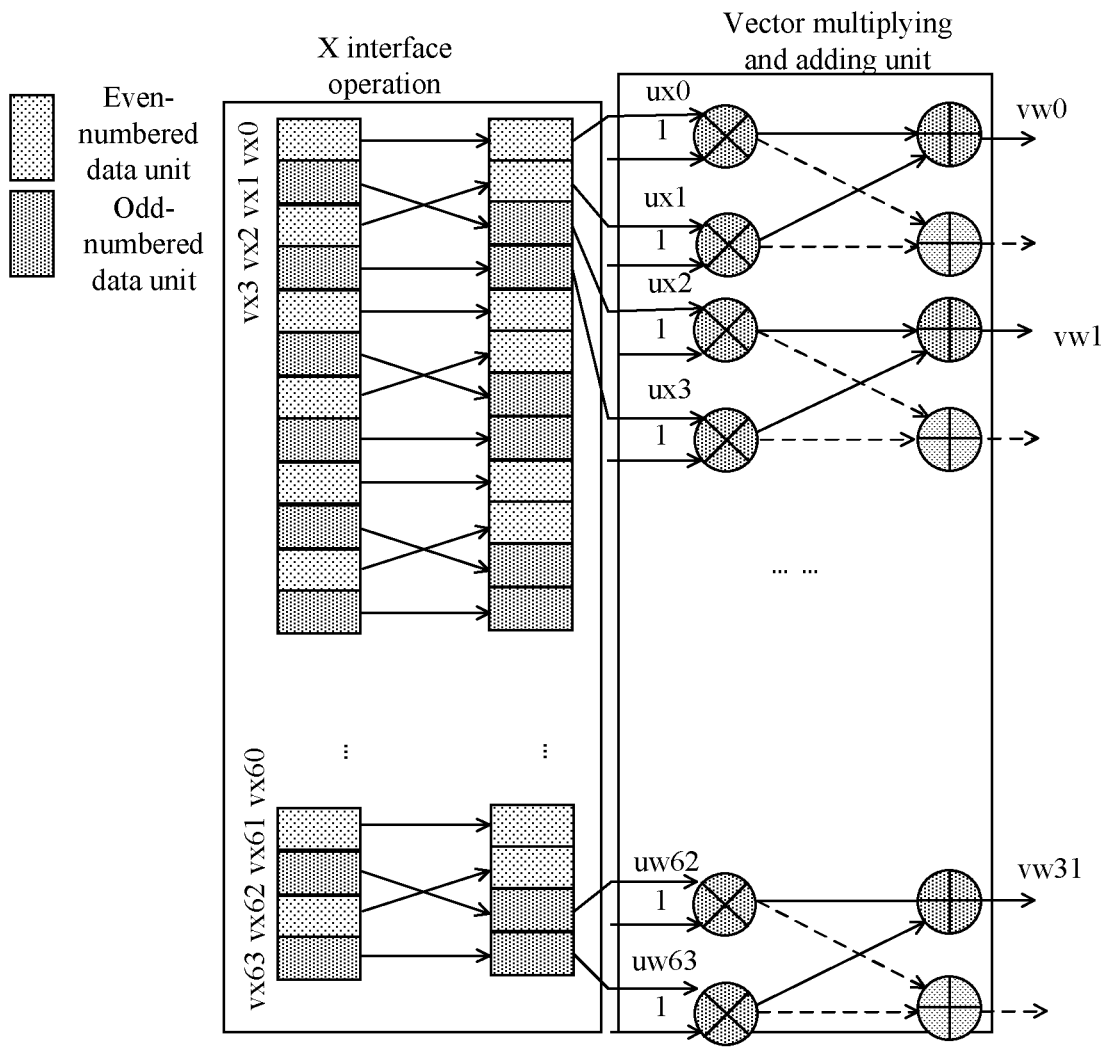
FIG. 6 is a block diagram showing the principle of an sxu command according to an embodiment of the present disclosure.

FIG. 6 is a block diagram showing the principle of an sxu command according to an embodiment of the present disclosure. As shown in FIG. 6, the to-be-accumulated data is read from a reading interface vx, and is sent to a vector multiplying and adding unit after position exchange is completed at an X interface, and the vector multiplying and adding unit accumulates every two adjacent pieces of data to obtain 16 complex results. In the figure, dotted lines indicate that connection is not required, and grey adders are not required during execution of the command. It can be seen that the abovementioned commands for implementing de-scrambling and de-spreading are all implemented by the vector multiplying and adding units with common functions without high hardware cost.

Figure 7:
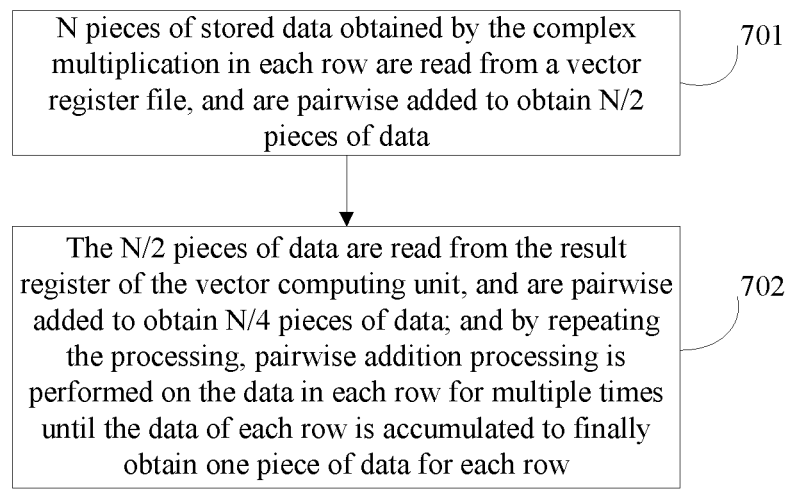
FIG. 7 is an implementation flowchart of another method for accumulating each row of data obtained by the complex multiplication in a vector register file in FIG. 2 according to an embodiment of the present disclosure.

FIG. 7 is an implementation flowchart of another implementation method for Step 202 according to an embodiment of the present disclosure. As shown in FIG. 7, the method includes:

Step 701: N pieces of stored data obtained by the complex multiplication in each row are read from the vector register file, and are pairwise added to obtain N/2 pieces of data, wherein the difference with Step 501 is that the results obtained by pairwise addition are not required to be stored into the vector register file here; and Step 702: the N/2 pieces of data are read from the result register of the vector computing unit, and are pairwise added to obtain N/4 pieces of data; and by repeating the processing, pairwise addition processing is performed on the data in each row for multiple times until the data of each row is accumulated to finally obtain one piece of data for each row, wherein N is a positive integer.

Here, only first accumulation requires reading of the N pieces of data from the register file, subsequent accumulation is performed by reading data from the result register of the operation unit. Compared with reading from the register file, reading from the result register has the advantages that a clock cycle delay can be reduced to a great extent and accumulation can be continuously performed.

The flow of the embodiment supports implementation of accumulation, which reduces the amount of data in the vector to a half of the original data amount, through feedback. Feedback can be continuously implemented with a short delay, and a requirement on fast implementation of accumulation on a small amount of data is met.

In a practical application process, Step 701 and Step 702 are implemented on the basis of the vector computing unit by adopting an sxu2 command, wherein the sxu2 command is sxu2 op_num, vw, temp, nw; // representing to perform feedback accumulation based on a previous register result (temp) output by the adder. This command may support accumulation of 16 numbers to 8 numbers, accumulation of 8 numbers to 4 numbers, accumulation of 4 numbers to 2 numbers and accumulation of 2 numbers to 1 number. Nw represents that the results are not written back into the vector register so as to reduce power consumption.

In the above, op_num=16/8/4/2/1 represents the number of accumulation results, and is used in combination with write-mask to implement data writeback as required. If op_num=8 and mask=0x0000_00ff, it is indicated that the left 8 complexes may be written back. The clock for complex adders not executed can be closed to reduce power consumption.

Figure 8:
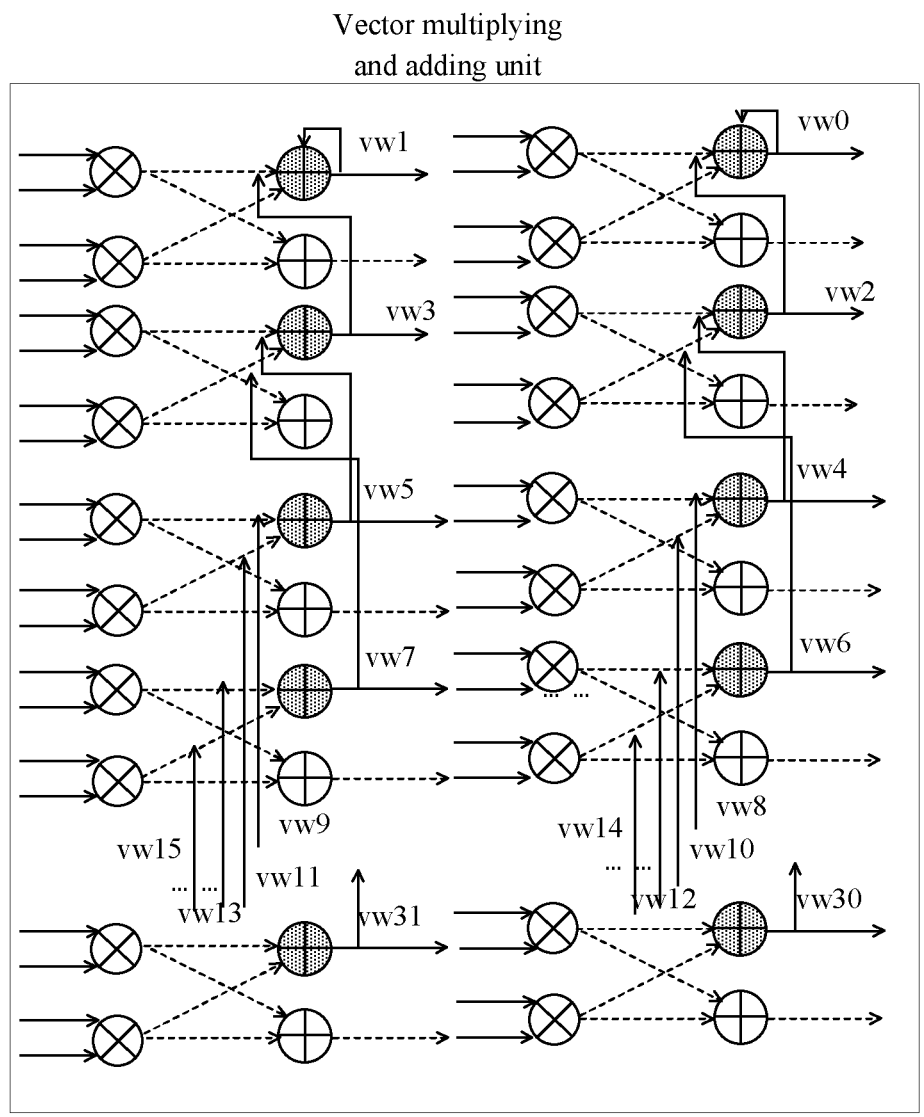
FIG. 8 is a block diagram showing the principle of an sxu2 command according to an embodiment of the present disclosure.

FIG. 8 is a block diagram showing the principle of an sxu2 command according to an embodiment of the present disclosure. As shown in FIG. 8, sxu2 is an optimized feedback accumulation command for improvement during accumulation of a small amount of data.

The sxu command may be executed after previous sxu accumulated data is written into the vector register file, and there exists an interval of at least three other commands between the two sxu commands. Because an execution pipeline has four stages VRF->E0->E1->VWB from reading from the vector register file to writing back into the vector register.

When there is a large amount of data to be accumulated, efficiency loss may be avoided by arrangement as follows:
sxu 16, v8, v0; //{v1,v0}->v8 first accumulation
sxu 16, v9, v2; //{v3,v2}->v8
sxu 16, v10, v4; //{v5,v4}->v8
sxu 16, v11, v6; //{v7,v6}->v8
sxu 8, v0, v8; //v8->v0, second accumulation
. . .

However, when only {v1,v0} is required to be accumulated to one complex, three commands are required between two accumulation commands, which results in a very low efficiency.

Here, an optimized accumulation command sxu2 op_num, vw, temp, nw; is used. In this command, temp is used to represent that input accumulated data is from a temporary register output by the adder last time. The other parameters are the same as those of the sxu command. The sxu2 command may support 16->8, 8->4, 4->2 and 2->1, and the first accumulation of 32->16 still requires an sxu command.

As shown in FIG. 8, dotted lines represent that connection is not required, grey elements are not used in the accumulation. The abovementioned example is implemented by sxu2 in the following manner.
sxu 16, v8, v0, nw; //{v1,v0}->temp
sxu2 8, v0, temp, nw; //temp->temp second accumulation
sxu 2 4, v0, temp, nw; //temp->temp third accumulation
sxu 2 2, v0, temp, nw; //temp->temp fourth accumulation
sxu 2 1, v0, temp, nw; //temp->v0 fifth accumulation, a result being in v0[0].

In an exemplary embodiment, the method further includes that: when each row of baseband data is read from the vector register file, the de-scrambling and de-spreading code corresponding to the row of baseband data is generated. Therefore, de-scrambling and de-spreading efficiency may be improved, and a de-scrambling and de-spreading code storage requirement and Random Access Memory (RAM) reading and writing power consumption may be reduced.

The step that the baseband data is transformed according to the de-scrambling and de-spreading codes in the detailed descriptions about Step 201 is implemented as follows:
complex real and virtual part position exchange and operation of negating real part or virtual part symbols are performed on the read baseband data according to the de-scrambling and de-spreading codes.

Figure 9:
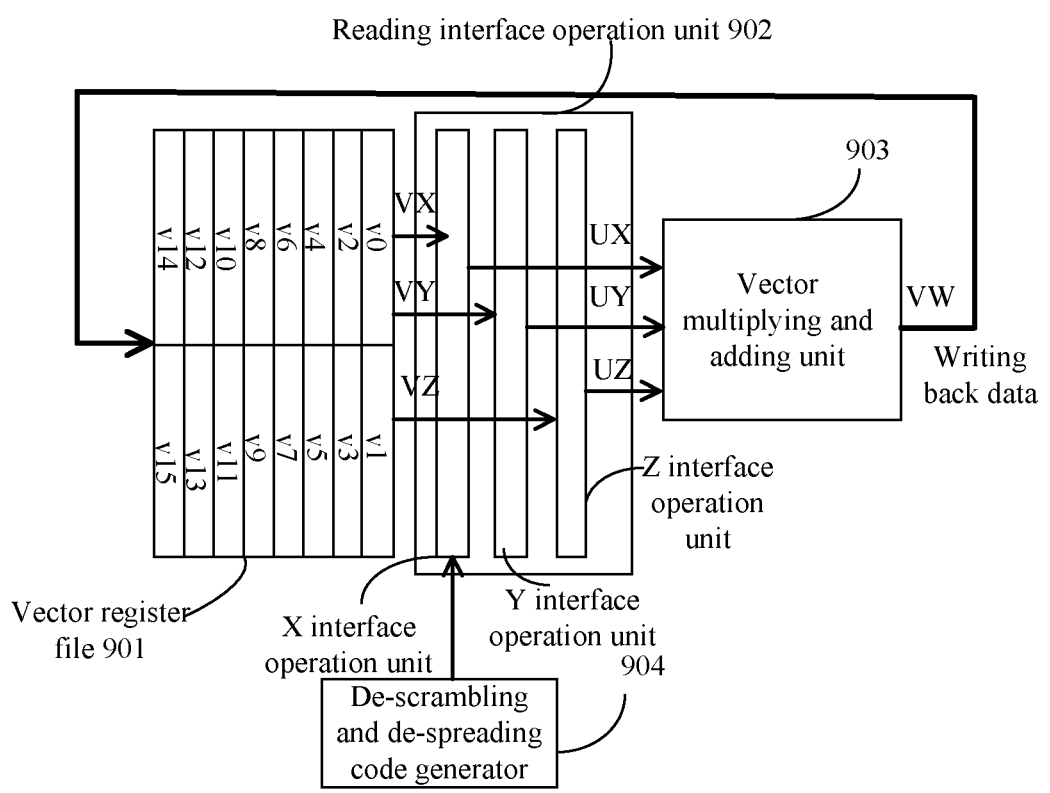
FIG. 9 is a structure diagram of a vector computing unit for implementing de-scrambling and de-spreading according to an embodiment of the present disclosure.

The embodiment of the present disclosure further provides a vector computing unit for implementing de-scrambling and de-spreading. As shown in FIG. 9, the vector computing unit includes: a vector register file 901, a reading interface operation unit 902 and a vector multiplying and adding unit 903, wherein the vector register file 901 is configured to store baseband data, results obtained by multiplying the baseband data and corresponding de-scrambling and de-spreading codes, inter-row data accumulation results and intra-row pairwise data accumulation results;

the reading interface operation unit 902 is configured to read the baseband data from the vector register file 901 and perform data transformation on the baseband data according to the corresponding de-scrambling and de-spreading codes, or, read data obtained by multiplying the baseband data and the de-scrambling and de-spreading codes or accumulated data from the vector register file 901 and perform data position exchange required by addition of every two adjacent pieces of data; and the vector multiplying and adding unit 903 is configured to perform addition processing on the data transformed by the reading interface operation unit and store an obtained result into the vector register file 901, and is further configured to read from the vector register file a row of data obtained by the complex multiplication 901, accumulate every two adjacent pieces of data to obtain a half row of data, store the obtained data back into the vector register file, continue reading a previous accumulation result from the vector register file 901 or a previous accumulation result reserved in a result register of the vector computing unit, accumulate every two adjacent pieces of data in the previous accumulation result to obtain a ¼ row of data, continue accumulation to finally obtain one piece of accumulated data, and continue the accumulation processing on other rows of data to implement accumulation of each row of data obtained by the complex multiplication in the vector register file 901.

In an exemplary embodiment, the vector computing unit may further include: a de-scrambling and de-spreading code generator 904, configured to, when the reading interface operation unit reads each row of baseband data from the vector register file 901, generate a de-scrambling and de-spreading code corresponding to the baseband data of this row.

The vector multiplying and adding unit may be configured to accumulate each row of data obtained by the complex multiplication from the vector register file in a manner as follows:

N pieces of stored data obtained by the complex multiplication in each row are read from the vector register file, and are pairwise added to obtain N/2 pieces of data, and the N/2 pieces of data are stored into the vector register file; the N/2 pieces of data are read from the vector register file, and are pairwise added to obtain N/4 pieces of data, and the N/4 pieces of data are stored; and by repeating the processing, pairwise addition processing is performed on the stored data obtained by the complex multiplication in each row in the vector register file for multiple times until the data of each row is accumulated to finally obtain one piece of data for each row, wherein N is a positive integer.

The vector multiplying and adding unit may be configured to accumulate each row of data obtained by the complex multiplication from the vector register file in a manner as follows:

N pieces of stored data obtained by the complex multiplication in each row are read from the vector register file, and are pairwise added to obtain N/2 pieces of data; the N/2 pieces of data are read from the result register of the vector computing unit, and are pairwise added to obtain N/4 pieces of data; and by repeating the processing, pairwise addition processing is performed on the data in each row for multiple times until the data of each row is accumulated to finally obtain one piece of data for each row, wherein N is a positive integer.

In a practical application process, the vector computing unit shown in FIG. 9 may include: the vector register file, the vector multiplying and adding unit and the reading interface operation unit, and may further include the de-scrambling and de-spreading code generator. The reading interface operation unit may include: an X reading interface operation unit, a Y reading interface operation unit and a Z reading interface operation unit. Of course, other parts may also be required practically, such as: a data RAM, a program RAM, a command reading controller, a command pipeline and a command decoder, which will not be elaborated.

The baseband data is downloaded into a RAM from an external device, and is read into the vector register file from the RAM during calculation. The vector register file serves as a calculated data cache, and the number of vector rows and a vector width are set according to data to be processed. Here, the vector register file includes 8 rows, each row is divided into 2 half rows, addressing can be performed for either one row or a half row, each row of vectors includes 32 complexes, and each half row includes 16 complexes. Here, the 8 rows are set to be {v1,v0}, {v3,v2}, . . . {v15,v14} respectively, each vv represents a half row, and a pair of vv represent an entire row.

The vector register file has three reading interfaces X, Y and Z. Three pairs of vv or three vv (the three reading interfaces may read the same vv) which are read may be transformed by the X reading interface operation unit, the Y reading interface operation unit and the Z reading interface operation unit respectively. The transformation may be: negation, conjugation, real part resetting, virtual part resetting, data replacement of a real part with a virtual part, data replacement of the virtual part with the real part and transformation of positions of data units according to different operation. The X reading interface operation unit may further perform one or combination of operation of real part negation, virtual part negation and real and virtual part exchange on the data units according to the input de-scrambling and de-spreading codes.

The X, Y and Z reading interface operation units usually realize functions of X*Y+Z. In a de-scrambling and de-spreading process in the embodiment of the present disclosure, only the X reading interface operation unit is used, Y is set to be 1 and Z is set to be 0. The X reading interface operation unit performs complex real and virtual part position exchange and real or virtual part symbol negation operation on the read data according to the de-scrambling and de-spreading codes.

The vector multiplying and adding unit implements complex multiplication, multiplication addition and multiplication accumulation, real number multiplication, multiplication addition and multiplication accumulation and FFT butterfly operation of an ordinary vector. For the de-scrambling and de-spreading process in the embodiment of the present disclosure, the vector multiplying and adding unit only uses adders, and some input data requires symbol negation. In addition, when feedback accumulation is supported, the output of the adders may be written back to the input of the adders. Here, since there is no accumulation of 32 numbers to 1 number but accumulation of 32 numbers to 16 numbers in the embodiment of the present disclosure, only existing adders are used without adding any new adders.

The de-scrambling and de-spreading code generator may set an initial state according to information such as a position in a cell Identity (ID) frame, then generate 32 corresponding codes (2 bit represent a complex and there are totally 64 bits) every time along with a de-scrambling and de-spreading command mult 1nj or mac 1nj, and send the codes to the X reading interface operation unit to control transformation of the data read by the X reading interface. Generation of the de-scrambling and de-spreading codes is not the key of the embodiment of the present disclosure, and will not be elaborated herein.

Based on the vector computing unit, de-scrambling and de-spreading of the baseband data are sequentially executed according to programming commands, so that the de-scrambling and de-spreading code generator may automatically generate the next de-scrambling and de-spreading codes every time when a mult 1nj or mac 1nj command is executed. In case of data sequence interruption, it is needed to reset an initial value of the de-scrambling and de-spreading code generator.

It is important to note that the baseband data stored in the vector register file vv is aligned with a generated de-scrambling and de-spreading code sequence, which is implemented by alignment operation conducted when reading the data into the vector register file from the RAM and will not be elaborated herein.

Simple parallel accumulation, for 32 pieces of data, for example, usually requires 5 stages, sequentially uses 16, 8, 4, 2 and 1, totally 31, adders, and uses 31×2=62 adders in case of complex accumulation, and the operation unit in a chip occupies a very large area. In the embodiment of the present disclosure, only 32 adders are used for accumulation of 32 complexes, so that the area is greatly reduced, and a logic of a common multiplier and adder may be substantially multiplexed.

The flow of the embodiments of the present disclosure will be described below with the situation that a spreading factor is 32 and there are 32 complexes as an example.

It is supposed that the baseband data has existed in vector register {v1,v0}, and the method shown in FIG. 5 is adopted to implement de-scrambling and de-spreading as follows:

mult v8, v0, 1nj; // the 32 complexes in {v1,v0} are multiplied by de-scrambling and de-spreading codes, and results are stored into {v9,v8},
nop;
nop;
nop;
sxu 16 v8, v8, nw; //32-16 represents accumulation of 32 numbers to 16 numbers, the same below,
nop;
nop;
nop;
sxu 8 v8, v8, nw; //16-8
nop;
nop;
nop
sxu 4 v8, v8, nw; //8-4
nop;
nop;
nop;
sxu 2 v8, v8, nw; //4-2
nop;
nop;
nop;
sxu 1 v8, v8; //2-1

Only one row may be read from the vector register according to each sxu command, and 16 pieces of data are obtained by accumulating every two adjacent pieces of data, and are written back. One result may finally be obtained by performing iterative accumulation for multiple times. Three nops or three other unrelated commands are required between every two commands in the above process, which results in very low efficiency. Three nops are required because the pipeline has totally four stages VRF-E0-E1-VWB from reading of the vector register and writing back into the vector register.

If an sxu2 command is used, the following processing is performed on the baseband data stored in the vector register {v1,v0}, that is, the method shown in FIG. 7 is adopted to implement de-scrambling and de-spreading:

mult v8, v0, 1nj; // 32 complexes in {v1,v0} are multiplied by the de-scrambling and de-spreading codes, and the results are stored into {v9,v8},
    nop;
    nop;
    nop;
    sxu 16 v8, v8, nw; //32-16
    sxu2 8 v8, temp, nw; //16-8
    sxu2 4 v8, temp, nw; //8-4
    sxu2 2 v8, temp, nw; //4-2
    sxu2 1 v8, temp; //2-1

Except the three nops between mult 1nj and sxu, the other nops are eliminated, so that efficiency is remarkably improved. Using sxu2 commands in case of small data volume may improve efficiency.

If sxu commands are used in case of large data volume, efficiency may be improved by programming splicing. Descriptions will be given with the situation that the spreading factor is 32 and there are 8×32 pieces of data as an example, and it is supposed that mult 1nj has been executed.

sxu 16 v8, v0; //{v1,v0}->v8
    sxu 16 v9, v2;
    sxu 16 v10, v4;
    sxu 16 v11, v6;
    // baseband data of v0~v7 is updated from the RAM, and then operation is continued
    sxu 16 v12, v0; //{v1,v0}->12
    sxu 16 v13, v2;
    sxu 16 v14, v4;
    sxu 16 v15, v6;
    // second round of accumulation
    sxu 16 v0, v8; //{v9,v8}->0
    sxu 16 v1, v10;
    sxu 16 v2, v12;
    sxu 16 v3, v14;
    // third round of accumulation
    nop;
    sxu 16 v0, v0; //{v1,v0}->0
    nop;
    sxu 16 v1, v2; //{v3,v2}->1
    // fourth round of accumulation
    Nop;
    Nop;
    Nop;
    sxu 16 v0, v0, nw; //{v1,v0}->0
    // fifth round of accumulation
    sxu 2 8 v0, temp; //temp->0 8 results Totally 21 clock cycles are used, and 5 nops may be utilized by finer splicing. A common solution employing 31 complex adders requires 8 cycles.

When the spreading factor is more than 32, for example, 256, it is needed to perform de-scrambling and de-spreading on 8 rows at first, and then inter-row accumulation is performed to obtain one row of data.

Mult 1nj;
    Mac 1nj; //1 a product of a command of a previous row is accumulated
    Mac 1nj; //2
    . . .
    Mac 1nj; //7

Subsequent operation is similar to channel factor 32.

Either the embodiment of the present disclosure or a common implementation manner requires inter-row accumulation of these operation cycles, 8+21: 8+8=29: 16, so that higher efficiency may be achieved by the embodiment of the present disclosure when the spreading factor is more than the vector data width.

Application of the four commands mult 1nj, mac 1nj, sxu and sxu2 of the embodiment of the present disclosure will further be described below with examples.

Embodiment 1 sxu2 commands are used for de-scrambling and de-spreading with the situation that the spreading factor is 128 and the accumulated data includes 128 complexes as an example, as follows:

mult v8, v0, 1nj, nw;
    mac v8, v2, 1nj, nw;
    mac v8, v4, 1nj, nw;
    mac v8, v6, 1nj; // related accumulation of four rows {v1,v0}, {v3,v2}, {v5,v4} and {v7,v6} to row {v9,v8} of the vector register is implemented
    nop; // or may be another command
    nop; // or may be another command
    nop; // or may be another command
    sxu 16 v8, v8, nw; // pairwise addition of a row is implemented to generate 16 complex results
    sxu 2 8 v8, temp, nw; // the 16 complexes stored in temp last time are accumulated to 8 complexes
    sxu 2 4 v8, temp, nw; // the 8 complexes stored in temp last time are accumulated to 4 complexes
    sxu2 2 v8, temp, nw; // the 4 complexes stored in temp last time are accumulated to 2 complexes
    sxu2 1 v8, temp; // the 2 complexes stored in temp last time are accumulated to 2 complexes
    mask=0x0000_0001 is automatically generated by hardware so that the lowest complex of the result is written into v8[0](0-31). Totally 12 cycles are used for de-scrambling and de-spreading of the 128 complexes based on the spreading factor 128. A common method for accumulation to 1 number once requires 5 cycles. In the embodiment of the present disclosure, 9 cycles are needed if nop is not considered, then 9:5 indicates that efficiency achieved by the method of the embodiment is higher than ½ of efficiency achieved by the common method.

Embodiment 2 sxu commands are used for de-scrambling and de-spreading with the situation that the spreading factor is 8 and the accumulated data includes 4×32 complexes as an example, as follows:

//step 1:
    mult v8, v0, 1nj; // relation of a row is implemented
    mult v10, v2, 1nj; // relation of a row is implemented
    mult v12, v4, 1nj; // relation of a row is implemented
    mult v14, v6, 1nj; // relation of a row is implemented
    //step 2:
    sxu 16 v0, v8; // pairwise addition of the 32 complexes of {v9,v8} is implemented to obtain 16 complex results sxu 16 v1, v10; // pairwise addition of the 32 complexes of {v11,v10} is implemented to obtain 16 complex results sxu 16 v2, v12; // pairwise addition of the 32 complexes of {v13,v12} is implemented to obtain 16 complex results sxu 16 v3, v14; // pairwise addition of the 32 complexes of {v15,v14} is implemented to obtain 16 complex results //step 3:

nop; // or may be another command sxu 16 v0, v0; //{v1,v0}-->v0 nop; // or may be another command sxu 16 v1, v2; //{v3,v2}-->v1

//step 4:

nop; // or may be another command nop; // or may be another command nop; // or may be another command sxu 16 v0, v0; //{v1,v0}-->v0 16 accumulation results are finally obtained and stored in v0

In the above example, totally 16 cycles are used to implement relation and accumulation of every 8 of 4×32 complexes. If a common manner of accumulating all 32 complexes in 5 stages is adopted, 4 cycles for relation and 4 cycles for accumulation, totally 8 cycles, are required. Efficiency achieved by the embodiment of the present disclosure is ½ of efficiency achieved by the common method. In the abovementioned solution, programming is not provided according to the arrangement with the highest efficiency because there are 5 command cycles (nop) therein, and if more data de-scrambling and de-spreading commands are arranged to fill the nops in the programming, then the ratio is (16-5): 8, which shows that a higher efficiency can be achieved.

Obviously, the embodiments of the present disclosure make the following improvements on the premise of not increasing the number of the adders:

1) operation of position exchange, symbol transformation and the like is performed on adjacent data units of a vector read by the X reading interface, and 2) adder output is written back to adder input, a de-scrambling and de-spreading function may be added with low circuit cost on the basis of a computing unit supporting common real and complex multiplication addition, multiplication accumulation and FFT butterfly operation.

In conclusion, in the embodiments of the present disclosure, the de-scrambling and de-spreading function may be realized with low implementation cost only by changing a small number of connecting lines on the basis of a common vector computing unit. Moreover, by the specific command-accompanying de-scrambling and de-spreading code generator, de-scrambling and de-spreading efficiency may be improved, and the de-scrambling and de-spreading code storage requirement and the RAM reading and writing power consumption may be reduced.

In addition, the implementation process of multiplying the de-scrambling and de-spreading codes and the baseband data is implemented only by simple addition operation in the embodiments of the present disclosure, rather than general multiplication, so that the power consumption is lower.

Those skilled in the art should know that the embodiment of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media (including, but not limited to, a disk memory, an optical memory and the like) including computer-available program codes.

The present disclosure is described with reference to flowcharts and/or block diagrams of the method, equipment (system) and computer program product according to the embodiment of the present disclosure. It should be understood that each flow and/or block in the flowcharts and/or the block diagrams and combinations of the flows and/or blocks in the flowcharts and/or the block diagrams may be implemented by computer program commands. These computer program commands may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the commands executed through the computer or the processor of the other programmable data processing equipment.

These computer program commands may also be stored in a computer-readable memory capable of guiding the computer or the other programmable data processing equipment to work in a specific manner, so that a product including a command device may be generated by the commands stored in the computer-readable memory, the command device realizing the function specified in one flow or many flows in the flowcharts and/or one block or many blocks in the block diagrams.

These computer program commands may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the commands executed on the computer or the other programmable data processing equipment.

Correspondingly, the embodiment of the present disclosure further provides a computer storage medium, in which a computer program is stored, the computer program being configured to execute the method for implementing de-scrambling and de-spreading in the embodiment of the present disclosure.

The above is only the preferred embodiment of the present disclosure and not intended to limit the scope of protection of the present disclosure.

INDUSTRIAL APPLICABILITY

According to each embodiment of the present disclosure, the implementation process of multiplying the de-scrambling and de-spreading codes and the baseband data is implemented only by simple transformation and addition operation rather than general multiplication, and the de-scrambling and de-spreading codes are generated together with the baseband data, and are not required to be read, so that efficiency is improved. Moreover, during intra-row pairwise data accumulation, an iteration method which fully utilizes all the adders may be used during each accumulation, so that efficiency is improved, and power consumption is lower.

What is claimed is:

1. A method for implementing de-scrambling and de-spreading, comprising:

performing an operation of complex multiplication on baseband data and corresponding de-scrambling and de-spreading codes by adopting data transformation and addition, and storing data obtained by the complex multiplication into a vector register file;

reading from the vector register file a row of data obtained by the complex multiplication, accumulating every two adjacent pieces of data in the row of data to obtain a half row of data, and storing the obtained data back into the vector register file; continuing reading a previous accumulation result from the vector register file or a previous accumulation result reserved in a result register of a vector computing unit, accumulating every two adjacent pieces of data in the previous accumulation result to obtain a ¼ row of data, and continuing accumulation to finally obtain one piece of accumulated data; and continuing the accumulation processing on other rows of data to implement accumulation of each row of data obtained by the complex multiplication in the vector register file.

2. The method as claimed in claim 1, wherein performing the operation of complex multiplication on the baseband data and the corresponding de-scrambling and de-spreading codes by adopting data transformation and addition and storing the data obtained by the complex multiplication comprises:

transforming a first row of baseband data read from the vector register file according to a corresponding de-scrambling and de-spreading code, adding data obtained by transformation, and storing an obtained result in the vector register file; executing the same transformation and addition processing on a second row of baseband data read from the vector register file to implement multiplication with a corresponding de-scrambling and de-spreading code; if the results of the two rows of baseband data are required to be accumulated, accumulating a result of a current row of baseband data with a result of a previous row of baseband data stored in the result register of the vector computing unit after multiplication with the corresponding de-scrambling and de-spreading code is implemented, and then storing an accumulation result back into the vector register file; and continuing the same processing on other rows of baseband data to implement multiplication of all the baseband data and the corresponding de-scrambling and de-spreading codes.

3. The method as claimed in claim 2, further comprising: when each row of baseband data is read from the vector register file, generating the de-scrambling and de-spreading code corresponding to the row of baseband data.

4. The method as claimed in claim 3, wherein accumulating the data obtained by the complex multiplication in each row in the vector register file comprises:

reading N pieces of stored data obtained by the complex multiplication in each row from the vector register file, performing pairwise addition to obtain N/2 pieces of data, and storing the N/2 pieces of data into the vector register file; reading the N/2 pieces of data from the vector register file, performing pairwise addition to obtain N/4 pieces of data, and storing the N/4 pieces of data; and by parity of reasoning, performing pairwise addition processing on the stored data obtained by the complex multiplication in each row in the vector register file for multiple times until the data of each row is accumulated to finally obtain one piece of data for each row, wherein N is a positive integer.

5. The method as claimed in claim 3, wherein accumulating the data obtained by the complex multiplication in each row in the vector register file comprises:

reading N pieces of stored data obtained by the complex multiplication in each row from the vector register file, and performing pairwise addition to obtain N/2 pieces of data; reading the N/2 pieces of data from the result register of the vector computing unit, and performing pairwise addition to obtain N/4 pieces of data; and by repeating the processing, performing pairwise addition processing on the data in each row for multiple times until the data of each row is accumulated to finally obtain one piece of data for each row, wherein N is a positive integer.

6. The method as claimed in claim 2, wherein transforming the baseband data according to the de-scrambling and de-spreading codes comprises:

according to the de-scrambling and de-spreading codes, performing complex real and virtual part position exchange on the read baseband data and performing operation of negating real part or virtual part symbols.

7. The method as claimed in claim 6, wherein accumulating the data obtained by the complex multiplication in each row in the vector register file comprises:

reading N pieces of stored data obtained by the complex multiplication in each row from the vector register file, performing pairwise addition to obtain N/2 pieces of data, and storing the N/2 pieces of data into the vector register file; reading the N/2 pieces of data from the vector register file, performing pairwise addition to obtain N/4 pieces of data, and storing the N/4 pieces of data; and by parity of reasoning, performing pairwise addition processing on the stored data obtained by the complex multiplication in each row in the vector register file for multiple times until the data of each row is accumulated to finally obtain one piece of data for each row, wherein N is a positive integer.

8. The method as claimed in claim 6, wherein accumulating the data obtained by the complex multiplication in each row in the vector register file comprises:

reading N pieces of stored data obtained by the complex multiplication in each row from the vector register file, and performing pairwise addition to obtain N/2 pieces of data; reading the N/2 pieces of data from the result register of the vector computing unit, and performing pairwise addition to obtain N/4 pieces of data; and by repeating the processing, performing pairwise addition processing on the data in each row for multiple times until the data of each row is accumulated to finally obtain one piece of data for each row, wherein N is a positive integer.

9. The method as claimed in claim 2, wherein accumulating the data obtained by the complex multiplication in each row in the vector register file comprises:

reading N pieces of stored data obtained by the complex multiplication in each row from the vector register file, performing pairwise addition to obtain N/2 pieces of data, and storing the N/2 pieces of data into the vector register file; reading the N/2 pieces of data from the vector register file, performing pairwise addition to obtain N/4 pieces of data, and storing the N/4 pieces of data; and by parity of reasoning, performing pairwise addition processing on the stored data obtained by the complex multiplication in each row in the vector register file for multiple times until the data of each row is accumulated to finally obtain one piece of data for each row, wherein N is a positive integer.

10. The method as claimed in claim 2, wherein accumulating the data obtained by the complex multiplication in each row in the vector register file comprises:

reading N pieces of stored data obtained by the complex multiplication in each row from the vector register file, and performing pairwise addition to obtain N/2 pieces of data; reading the N/2 pieces of data from the result register of the vector computing unit, and performing pairwise addition to obtain N/4 pieces of data; and by repeating the processing, performing pairwise addition processing on the data in each row for multiple times until the data of each row is accumulated to finally obtain one piece of data for each row, wherein N is a positive integer.

11. A non-transitory computer storage medium, in which a computer program is stored, the computer program being configured to execute the method for implementing de-scrambling and de-spreading as claimed in claim 2.

12. The method as claimed in claim 1, wherein accumulating the data obtained by the complex multiplication in each row in the vector register file comprises:

reading N pieces of stored data obtained by the complex multiplication in each row from the vector register file, performing pairwise addition to obtain N/2 pieces of data, and storing the N/2 pieces of data into the vector register file; reading the N/2 pieces of data from the vector register file, performing pairwise addition to obtain N/4 pieces of data, and storing the N/4 pieces of data; and by parity of reasoning, performing pairwise addition processing on the stored data obtained by the complex multiplication in each row in the vector register file for multiple times until the data of each row is accumulated to finally obtain one piece of data for each row, wherein N is a positive integer.

13. A non-transitory computer storage medium, in which a computer program is stored, the computer program being configured to execute the method for implementing de-scrambling and de-spreading as claimed in claim 12.

14. The method as claimed in claim 1, wherein accumulating the data obtained by the complex multiplication in each row in the vector register file comprises:

reading N pieces of stored data obtained by the complex multiplication in each row from the vector register file, and performing pairwise addition to obtain N/2 pieces of data; reading the N/2 pieces of data from the result register of the vector computing unit, and performing pairwise addition to obtain N/4 pieces of data; and by repeating the processing, performing pairwise addition processing on the data in each row for multiple times until the data of each row is accumulated to finally obtain one piece of data for each row, wherein N is a positive integer.

15. A non-transitory computer storage medium, in which a computer program is stored, the computer program being configured to execute the method for implementing de-scrambling and de-spreading as claimed in claim 1.

16. A vector computing unit for implementing de-scrambling and de-spreading, comprising: a vector register file, a reading interface operation unit and a vector multiplying and adding unit, wherein the vector register file is configured to store baseband data, results obtained by multiplying the baseband data and corresponding de-scrambling and de-spreading codes, inter-row data accumulation results and intra-row pairwise data accumulation results;

the reading interface operation unit is configured to read the baseband data from the vector register file and perform data transformation on the baseband data according to the corresponding de-scrambling and de-spreading codes, or, read data obtained by multiplying the baseband data and the de-scrambling and de-spreading codes or accumulated data from the vector register file and perform data position exchange required by addition of every two adjacent pieces of data; and the vector multiplying and adding unit is configured to perform addition processing on the data transformed by the reading interface operation unit and store an obtained result into the vector register file, and is further configured to read from the vector register file a row of data obtained by the complex multiplication, accumulate every two adjacent pieces of data to obtain a half row of data, store the obtained data back into the vector register file, continue reading a previous accumulation result from the vector register file or a previous accumulation result reserved in a result register of the vector computing unit, accumulate every two adjacent pieces of data in the previous accumulation result to obtain a ¼ row of data, continue accumulation to finally obtain one piece of accumulated data; and continue the accumulation processing on other rows of data to implement accumulation of each row of data obtained by the complex multiplication in the vector register file.

17. The vector computing unit as claimed in claim 16, further comprising: a de-scrambling and de-spreading code generator, configured to, when the reading interface operation unit reads each row of baseband data from the vector register file, generate the de-scrambling and de-spreading code corresponding to the row of baseband data.

18. The vector computing unit as claimed in claim 17, wherein the vector multiplying and adding unit is configured to accumulate each row of data obtained by the complex multiplication from the vector register file in a manner as follows:

N pieces of stored data obtained by the complex multiplication in each row are read from the vector register file, and are pairwise added to obtain N/2 pieces of data; the N/2 pieces of data are read from the result register of the vector computing unit, and are pairwise added to obtain N/4 pieces of data; and by repeating the processing, pairwise addition processing is performed on the data in each row for multiple times until the data of each row is accumulated to finally obtain one piece of data for each row, wherein N is a positive integer.

19. The vector computing unit as claimed in claim 16, wherein the vector multiplying and adding unit is configured to accumulate each row of data obtained by the complex multiplication from the vector register file in a manner as follows:

N pieces of stored data obtained by the complex multiplication in each row are read from the vector register file, and are pairwise added to obtain N/2 pieces of data, and the N/2 pieces of data are stored into the vector register file; the N/2 pieces of data are read from the vector register file, and are pairwise added to obtain N/4 pieces of data, and the N/4 pieces of data are stored; and by repeating the processing, pairwise addition processing is performed on the stored data obtained by the complex multiplication in each row in the vector register file for multiple times until the data of each row is accumulated to finally obtain one piece of data for each row, wherein N is a positive integer.

20. The vector computing unit as claimed in claim 16, wherein the vector multiplying and adding unit is configured to accumulate each row of data obtained by the complex multiplication from the vector register file in a manner as follows:

N pieces of stored data obtained by the complex multiplication in each row are read from the vector register file, and are pairwise added to obtain N/2 pieces of data; the N/2 pieces of data are read from the result register of the vector computing unit, and are pairwise added to obtain N/4 pieces of data; and by repeating the processing, pairwise addition processing is performed on the data in each row for multiple times until the data of each row is accumulated to finally obtain one piece of data for each row, wherein N is a positive integer.

\* \* \* \* \*